United States Patent
Lee et al.

(12)

(10) Patent No.: US 8,548,739 B2
(45) Date of Patent: Oct. 1, 2013

(54) NAVIGATION SYSTEM WITH INTERACTIVE ACCELEROMETER MECHANISM AND METHOD OF OPERATION THEREOF

(75) Inventors: Shane-Woei Lee, Fremont, CA (US);
Kiran Kumar Sachidananda Murthy, Sunnyvale, CA (US)

(73) Assignee: Telenav, Inc., Sunnyvale, CA (US)

( * ) Notice: Subject to any disclaimer, the term of this patent is extended or adjusted under 35 U.S.C. 154(b) by 79 days.

(21) Appl. No.: 13/025,134

(22) Filed: Feb. 10, 2011

(65) Prior Publication Data

US 2012/0209516 A1    Aug. 16, 2012

(51) Int. Cl.
*G01C 21/16* (2006.01)

(52) U.S. Cl.
USPC .......................................... 701/445; 701/500

(58) Field of Classification Search
USPC ................. 701/408, 412, 420, 421, 437, 449, 701/468, 469, 476, 495, 498, 500, 502, 505; 340/995.2, 995.25, 995.28; 348/158; 455/556.1, 556.2
See application file for complete search history.

(56) References Cited

U.S. PATENT DOCUMENTS

| | | | |
|---|---|---|---|
| 5,862,511 A | 1/1999 | Croyle et al. | |
| 6,014,610 A | 1/2000 | Judge et al. | |
| 6,029,111 A | 2/2000 | Croyle | |
| 6,308,134 B1 * | 10/2001 | Croyle et al. | 701/472 |
| 6,308,234 B1 * | 10/2001 | Davies et al. | 710/104 |
| 6,721,657 B2 * | 4/2004 | Ford et al. | 701/472 |
| 8,059,027 B2 * | 11/2011 | Khosravy et al. | 342/357.25 |
| 2007/0260398 A1 | 11/2007 | Stelpstra | |
| 2009/0160939 A1 * | 6/2009 | Fernandez et al. | 348/158 |
| 2009/0164120 A1 * | 6/2009 | Boore et al. | 701/210 |
| 2009/0192688 A1 | 7/2009 | Padmanabhan et al. | |
| 2010/0057359 A1 * | 3/2010 | Caballero et al. | 701/214 |
| 2010/0207787 A1 * | 8/2010 | Catten et al. | 340/905 |
| 2010/0250179 A1 * | 9/2010 | Mariano et al. | 702/96 |
| 2010/0292886 A1 * | 11/2010 | Szczerba et al. | 701/29 |
| 2011/0086703 A1 * | 4/2011 | Miller | 463/31 |
| 2011/0172909 A1 * | 7/2011 | Kahn et al. | 701/202 |
| 2012/0074818 A1 * | 3/2012 | Crowley et al. | 310/348 |

* cited by examiner

*Primary Examiner* — Marthe Marc-Coleman
(74) *Attorney, Agent, or Firm* — IP Investment Law Group

(57) ABSTRACT

A method of operation of a navigation system includes: detecting an accelerometer acceleration, having a magnitude and a direction, for monitoring a device; receiving a first location reading for locating the device with a remote location system; determining the first location reading as being invalid; and updating a device-location from the first location reading with the accelerometer acceleration for displaying on the device.

20 Claims, 7 Drawing Sheets

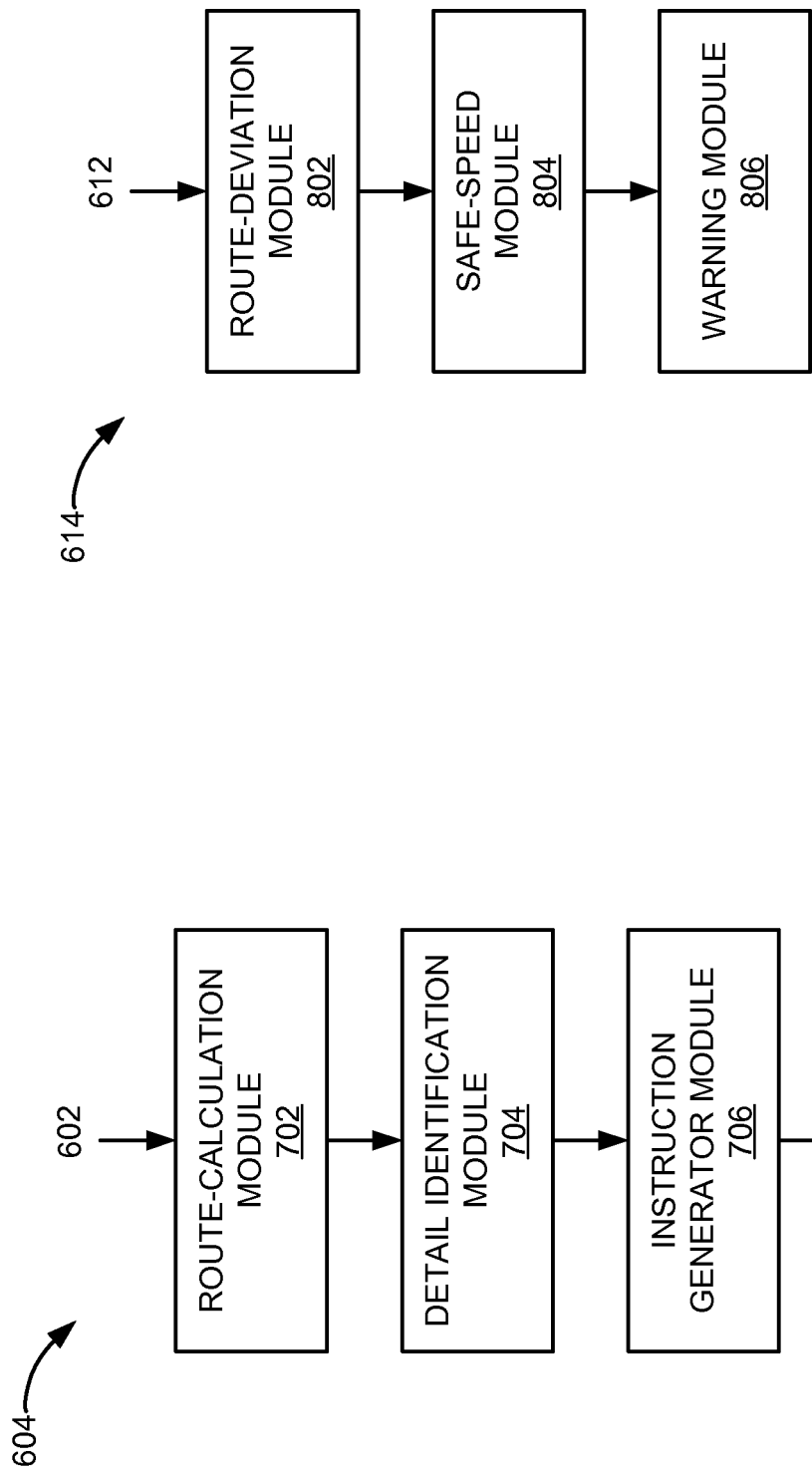

NAVIGATION SYSTEM WITH INTERACTIVE ACCELEROMETER MECHANISM AND METHOD OF OPERATION THEREOF

TECHNICAL FIELD

The present invention relates generally to a navigation system, and more particularly to a system for detecting movement and location.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile navigation service devices, new and old paradigms begin to take advantage of this new device space. There are many technological solutions to take advantage of this new device-location opportunity. One existing approach is to use location information to locate the user and guide the user to a destination.

Often, the granularity for detecting the movement is too coarse to detect movements within the road. Other times, the circumstances and the environment can degrade the accuracy in locating the user.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for a navigation system with interactive accelerometer mechanism.

DISCLOSURE OF THE INVENTION

The present invention provides a method of operation of a navigation system including: detecting an accelerometer acceleration, having a magnitude and a direction, for monitoring a device; receiving a first location reading for locating the device with a remote location system; determining the first location reading as being invalid; and updating a device-location from the first location reading with the accelerometer acceleration for displaying on the device.

The present invention provides a navigation system, including: a location unit for detecting an accelerometer acceleration, having a magnitude and a direction, for monitoring a device; a location receiver module, coupled to the location unit, for receiving a first location reading for locating the device with a remote location system; a reading validation module, coupled to the location receiver module, for determining the first location reading as being invalid; and a locator module, coupled to the reading validation module, for updating a device-location from the first location reading with the accelerometer acceleration for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 7 is a detailed view of the trip-planning module of FIG. 6.

FIG. 8 is a detailed view of the assistant module of FIG. 6.

BEST MODE FOR CARRYING OUT THE INVENTION

Figure 1:
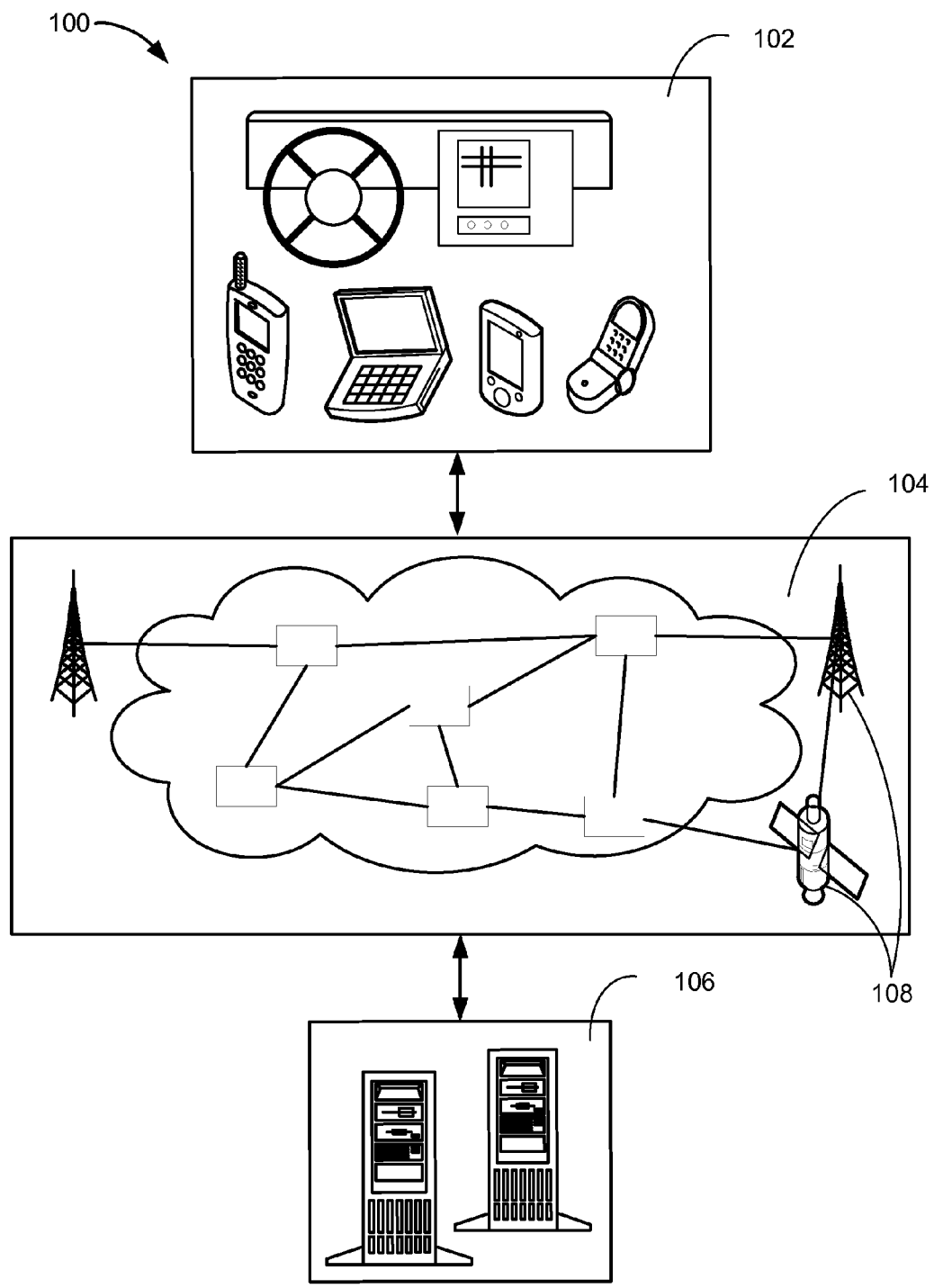
FIG. 1 is a navigation system with interactive accelerometer mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with interactive accelerometer mechanism in an embodiment of the present invention. The navigation system 100 includes a first device 102, such as a client or a server, connected to a second device 106, such as a client or server, with a communication path 104, such as a wireless or wired network. The navigation system 100 can interact with a remote location system 108.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

The remote location system 108 can be a device or a collection of devices that provide information necessary for locating remote devices. For example, the remote location system 108 can be the global positioning system (GPS) or a collection of cellular towers for locating user devices. The remote location system 108 can use the communication path 104 to transmit and deliver the location information. The remote location system 108 can deliver the location information to the first device 102, the second device 106, or a combination thereof.

Figure 2:
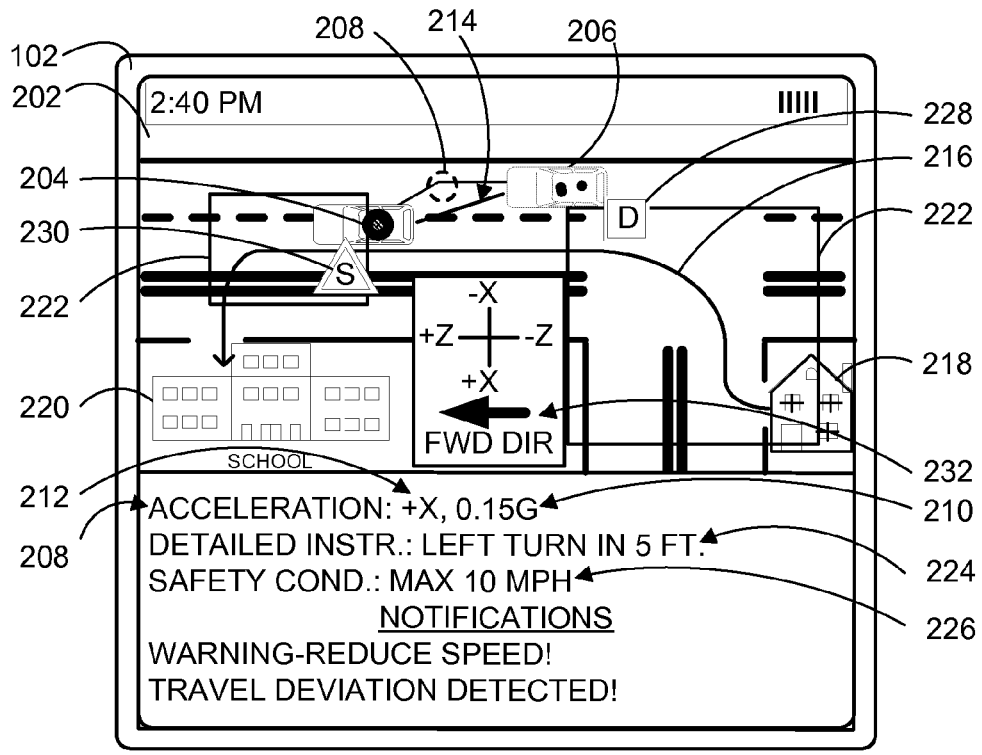
FIG. 2 is a first example of a display interface of the first device.

Referring now to FIG. 2, therein is shown a first example of a display interface 202 of the first device 102. The display interface 202 can show a device-location 204 and a last-known location 206.

The device-location 204 is the geographical location of the first device 102. The device-location 204 can be represented in multiple ways. For example, the device-location 204 can be a set of coordinates, such as GPS coordinates or longitude and latitude. Continuing with the example, the device-location 204 can be an address or a set of landmarks, such as the intersection of two roads or a highway exit.

The device-location 204 can also be represented relative to known landmarks. For example, the device-location 204 can be 5 miles north and 2 miles west of the user's home or 100 feet past the First Street exit on Highway 1, in the second lane from right.

The device-location 204 can also be represented relative to known location. For example, the device-location 204 can be the determined geographical location of the first device 102. The device-location 204 can be determined based on the last-known location 206, such as last valid GPS coordinate or the user's house.

The last-known location 206 is the received or calculated geographical location of the first device 102 prior to the current time. The last-known location 206 can be the value of the device-location 204 at a previous time.

The device-location 204 can be determined by tracking the movement of the first device 102 from the last-known location 206. The device-location 204 can also be determined by determining the coordinate information for the geographical location of the first device 102. The details of determining the device-location 204 and the last-known location 206 will be discussed below.

The display interface 202 can show an accelerometer acceleration 208. The accelerometer acceleration 208 can include a magnitude 210 and a direction 212.

The accelerometer acceleration 208 is an increase in the rate or speed along a direction, or a change in direction. The navigation system 100 can determine the accelerometer acceleration 208 of the first device 102. The method for determining the accelerometer acceleration 208 will be discussed below. The accelerometer acceleration 208 is depicted both textually and where the user moves left.

The magnitude 210 of the accelerometer acceleration 208 is the rate of change in speed along a direction or the rate of change in direction. The magnitude 210 can be represented as a function of time and velocity, a force, or a combination therein. For example, the accelerometer acceleration 208 can be denoted as 0-60 miles-per-hour in 6 seconds or as 0.1 g, where 1 g is the gravitational force of the earth.

The accelerometer acceleration 208 can include the direction 212. The direction 212 is the line or course along which a person or thing moves. For example, the direction 212 can be left or along the x-axis.

The direction 212 can be represented in relation to the user. The direction 212 can be from a set such as left, right, forward, back, up, and down or north-south-east-west. The direction 212 can also be from a set where negative x would be equivalent to right, positive z would be forward, and positive y would be up, as depicted. The polarity and the variable assigned to each direction can be different. For example, forward can be +y, left can be –z, and up can be +x.

Along with change in speed, a change in the direction 212 can constitute the accelerometer acceleration 208. For example, the accelerometer acceleration 208 for the vehicle accelerating forward 10 miles-per-hour each second can be 10 miles/hour/second forward and slowing down 10 miles-per-hour each second can be 10 miles/hour/second in the –z direction. Also, for example, a plane maneuvering left can be denoted as –5 g along the x-axis.

The display interface 202 can also show a movement displacement 214. The movement displacement 214 is the distance that the first device 102 travels while it is accelerating. The movement displacement 214 can be in the direction 212 of the accelerometer acceleration 208, and the movement displacement 214 can be determined over a given time span.

For example, if a vehicle steadily accelerates to 10 mph over an hour, the movement displacement 214 would be the 5 miles the vehicle travelled during that hour. The distance traveled during the accelerometer acceleration 208 is the magnitude of the movement displacement 214. The movement displacement 214 is the distance with the direction component of the accelerometer acceleration 208. The details of calculating the movement displacement 214 will be discussed below.

The display interface 202 can overlay a route 216, having a starting point 218 and a destination 220, on a displayed map. The route 216 is a route the user can traverse to get from the starting point 218 to the destination 220. The starting point 218 is a location where the user can start travelling. The destination 220 is a location where the user is designated to finish travelling or an end point of the route 216.

The route 216 can be overlaid by highlighting the starting point 218, the destination 220, and the path connecting the starting point 218 and the destination 220. The route 216 can also be overlaid by connecting the starting point 218 and the destination 220 with a line displayed over the path while displaying the route 216.

The starting point 218 and the destination 220 can be a structure, such as a house or a tower, a location within a structure, such as a designated seat in a stadium or a specific store in a shopping center. The starting point 218 and the destination 220 can also be a landmark, such as a mountain or a waterfall, or a user-named location, such as home or work.

The display interface 202 can show a detailed-guidance portion 222 on the route 216. The detailed-guidance portion 222 can have a detailed instruction 224 and a safety condition 226.

The detailed-guidance portion 222 is a portion on the route 216 that requires frequent routing instructions. The detailed-guidance portion 222 can be a portion that requires shorter update intervals for guiding the user. For example, turning right in 10 feet and entering the second entrance on the right would require more frequent routing instructions than continuing and/or staying on a highway.

The detailed-guidance portion 222 can be turns, highway exits, stops, mergers, or a combination thereof on the route 216. The detailed-guidance portion 222 can have the detailed instruction 224 and the safety condition 226.

The detailed instruction 224 is the routing instruction for guiding the user to follow the route 216 through the detailed-guidance portion 222. The safety condition 226 is the driving condition required to safely travel through the detailed-guidance portion 222. For example, the safety condition 226 can be the maximum speed of the user's vehicle before entering a turn necessary to go through the turn without losing control of the vehicle. Also, for example, the safety condition 226 can be the location of the user's vehicle in a certain lane to avoid dangers, such as accidents or ice patches.

The display interface 202 can show the details of the user's travel along the route 216. The display interface 202 can show a travel deviation 228, a reduce-speed warning 230, and a forward direction 232.

The travel deviation 228 is the occurrence when the user departs from the route 216. For example, the travel deviation 228 can be when the user moves a predetermined distance away from the route 216. Also, for example, the travel deviation 228 can be when the user does not follow the detailed instruction 224.

The reduce-speed warning 230 is an alert for the user to decelerate. The reduce-speed warning 230 can be given when the user exceeds the speed specified in the safety condition 226. For example, the reduce-speed warning 230 can be given if the user is traveling faster than 30 miles/hour 200 feet before the turn.

The forward direction 232 is the direction that the user is facing. The forward direction 232 can be the forward direction of the vehicle that the user is travelling in. The navigation system 100 can determine the forward direction 232 regardless of the orientation of the first device 102. The details of determining the forward direction 232 will be discussed below.

Figure 3:
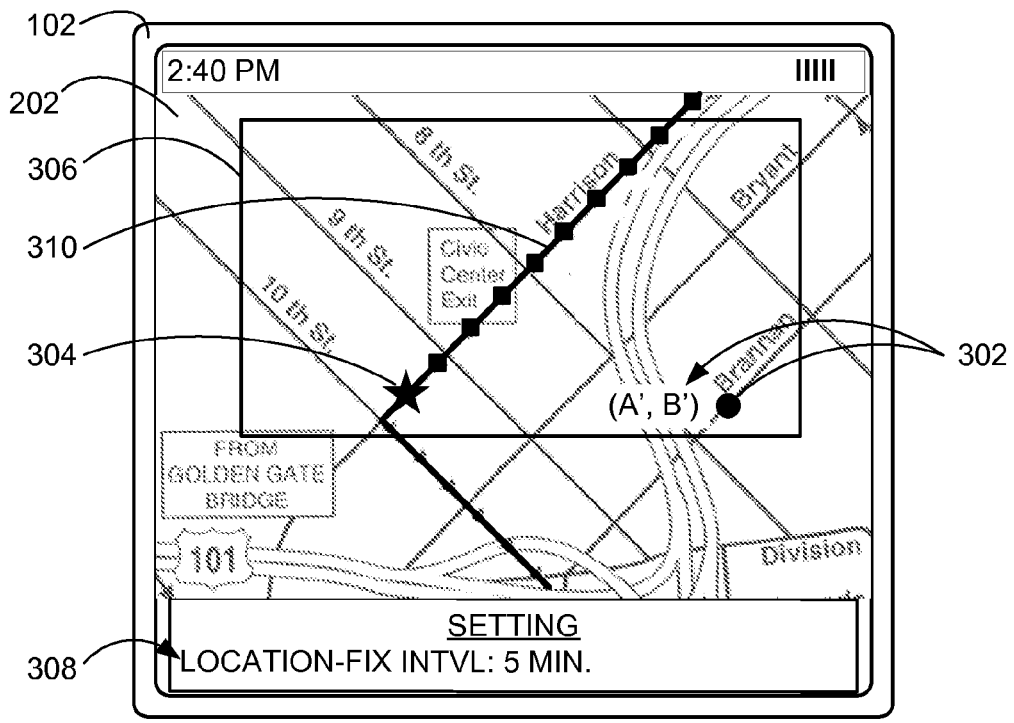
FIG. 3 is a second example of the display interface of the first device.

Referring now to FIG. 3, therein is shown a second example of the display interface 202 of the first device 102. The display interface 202 can show a first location reading 302, an accelerometer location reading 304, an inoperable zone 306, a location-fixing interval 308, and a travel path 310.

The first location reading 302 is the location information from the remote location system 108 of FIG. 1 for locating the first device 102. For example, the first location reading 302 can be the GPS coordinate or the latitude-longitude coordinate resulting from signals from the GPS system or a group of cellular towers.

The accelerometer location reading 304 is the calculated location information for locating the first device 102. The navigation system 100 can use the accelerometer acceleration 208 of FIG. 2 and the last-known location 206 of FIG. 2 to calculate the location of the first device 102. The details of calculating the accelerometer location reading 304 and the interaction with the first location reading 302 will be discussed below.

The inoperable zone 306 is a geographical area where the signal from the remote location system 108 is unreliable or not accessible. For example, the inoperable zone 306 can be a metropolitan area with multiple high-rise buildings where the signal from the remote location system 108 is blocked or creates multi-path problems. Also, for example, the inoperable zone 306 can be under-developed areas or mountainous regions where the signals from the remote location system 108 cannot reach.

The location-fixing interval 308 is the time period between receiving location information from the remote location system 108 for locating the first device 102. For example, the location-fixing interval 308 can be the time between operating the receiver and the translator for GPS signals. The location-fixing interval 308 can also be the time between triangulating the signals using the cellular phone towers.

The travel path 310 is the set of locations where the first device 102 was during a period of time. The travel path 310 can be a portion of the route 216 of FIG. 2 that the user travelled. For example, the travel path 310 can be the route 216 the user took to get from one point to another. Also for example, the travel path 310 can be a vehicle's movement and locations during the past 5 minutes.

Figure 4:
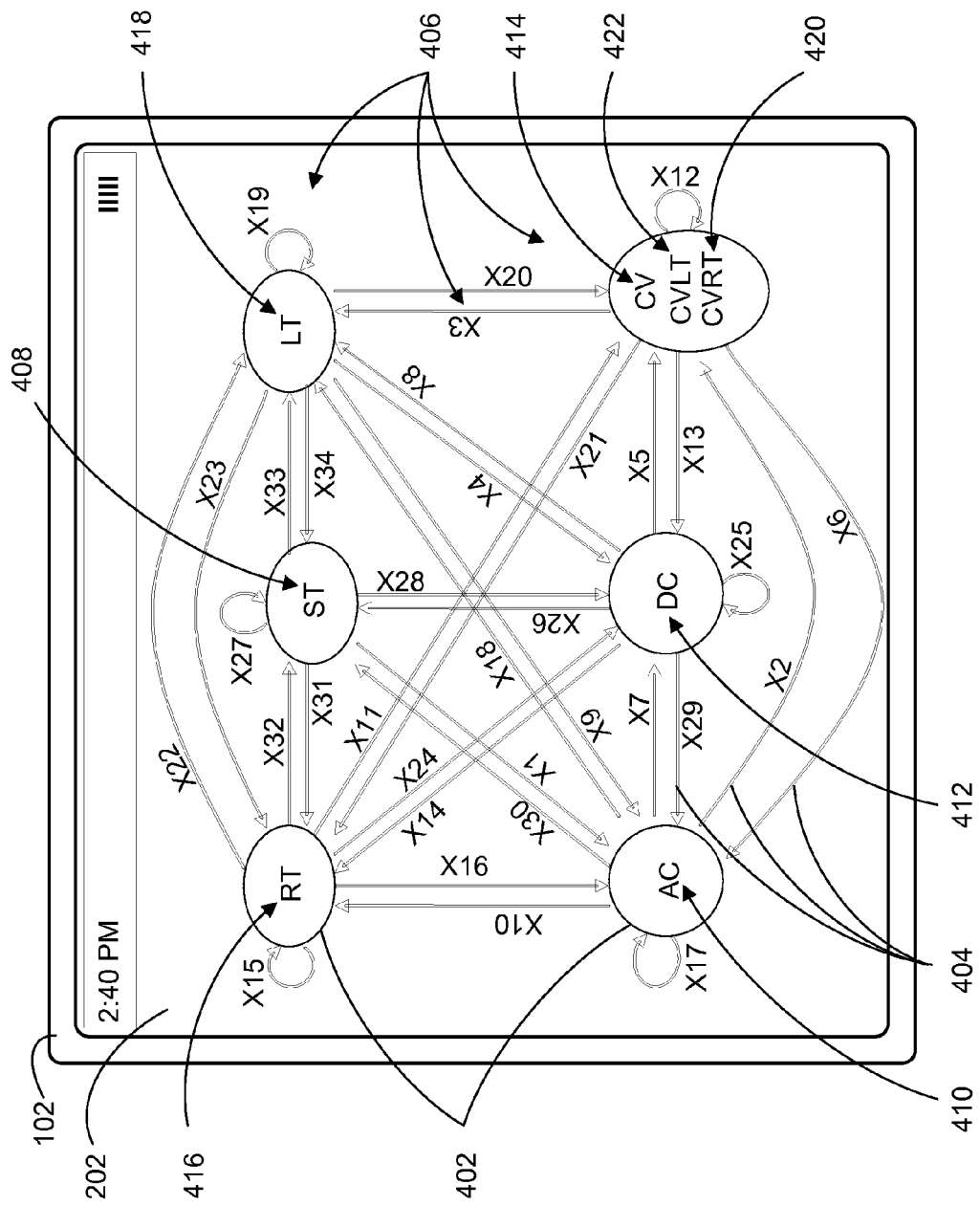
FIG. 4 is a third example of the display interface of the first device.

Referring now to FIG. 4, therein is shown a third example of the display interface 202 of the first device 102. The display interface 202 can display a travel state 402, a state change condition 404, and a state-path name 406. This third example depicts a state transition diagram of the navigation system 100 in a diagnostic mode, as an example. The diagnostic mode can be brought up in the first device 102 of FIG. 1, the second device 106 of FIG. 1, or both.

The travel state 402 is a current mode or condition during the user's travel as indicated by the movement of the first device 102. The travel state 402 can include a time marker, such as time of day or from when the trip started, for when the state occurred. For example, the travel state 402 can be acceleration, slowing down, stop, turn, constant velocity, or a combination thereof.

The navigation system 100 can detect or determine the travel state 402. The navigation system 100 can determine the travel state 402 using the state change condition 404. The state change condition 404 is the circumstance or factors that can change the travel state 402. For example, the state change condition 404 necessary for a stop state can be when the velocity is zero. Also, for example, the state change condition 404 necessary for a constant velocity state is when the velocity is detected or at the end of the accelerometer acceleration 208 of FIG. 2.

The state-path name 406 is the name, the label, or the designation given to a transition between states. The state-path name 406 can be a letter, number, symbol, or a combination thereof that indicates a certain transition between two states. For example, a path 1 or X1 can represent the transition from an initial or stopped state to moving state. The change in state described by path 1 can occur when the state change condition 404 of acceleration in the positive z-axis greater than 0.1 g is met.

The state-path name 406 can also be a description of the change between one value of the travel state 402 and a second value of the travel state 402. For example, "slowing down" or "reducing speed" can represent the transition between a constant speed state to a reducing speed state.

The display interface 202 can also display the various states that can be assigned to the travel state 402 using the state change condition 404 and the state-path name. The display interface 202 can display the travel state 402 as a static state 408, an acceleration state 410, a deceleration state 412, a constant velocity state 414, a right turn state 416, a left turn state 418, a steady right state 420, and a steady left state 422.

The static state 408 is where the subject, such as a person, thing, or the first device 102, is stopped with zero velocity. The travel state 402 can be the static state 408 when the first device 102 is first initialized or when the velocity of the first device is zero. The travel state 402 can also be the static state 408 when a series of acceleration, velocity, and deceleration matches the predetermined series of movements or activities that define the static state 408.

The travel state 402 can be the acceleration state 410 when the first device 102 is changing velocity as in changing the speed, the direction of travel, or a combination of both. The travel state 402 can be the acceleration state 410 when the subject is initially in the static state 408 and the accelerometer acceleration 208 is greater than 0.1 g. For example, the acceleration state 410 can also occur when there is a change in velocity.

The travel state 402 can be the acceleration state 410 when the subject, such as a vehicle or a person, changes the direction of travel and maintains the same speed. For example, ship travelling at a constant speed can turn to port at a rate where the accelerometer acceleration 208 would be 0.05 g in the −x direction.

The travel state 402 can be the deceleration state 412 when the subject is decreasing velocity. The travel state 402 can be the deceleration state 412 when the speed is being reduced, such as when a car comes to a stop. For example, the travel state 402 can be the deceleration state 412 the subject is initially travelling at a constant speed and the accelerometer acceleration 208 is less than −0.1 g along the z-axis.

The travel state 402 can be the constant velocity state 414 when the subject maintains the same speed and direction. The constant velocity state 414 can be when the car is steadily travelling at 60 mph on a flat road, while the car travels straight forward. For example, the constant velocity state can be when the accelerometer acceleration 208 is zero following the acceleration state 410.

The travel state 402 can be the right turn state 416 when the subject changes the direction of travel to the right, parallel to a road different from the one that the subject was traversing. For example, the travel state 402 can be the right turn state 416 can occur when a car moves from a road to another road that is perpendicular to the first road by executing a 90 degree turn to the right. Also, for example, the right turn state 416 can be when the accelerometer acceleration 208 is greater than +0.1 g along the x-axis for at least 2 seconds. The left turn state 418 is similar to the right turn state 416 but in the opposite direction.

The steady right state 420 is where the subject maintains the accelerometer acceleration 208 to the right, or the +x direction while maintaining the speed. The steady right state 420 can occur when the subject veers to the right, incongruent to the road. For example, the steady right state 420 can be when the user maintains speed and moves to the right on a straight road. The steady right state 420 can be the state where the state change condition 404 for both the constant velocity state 414 and the right turn state 416 are met.

The steady left state 422 is similar to the steady right state 420 but in the opposite direction. The steady left state 422 can be when the subject veers to the left, incongruent to the road. The steady left state 422 can be the state where the state change condition 404 for both the constant velocity state 414 and the left turn state 418 are met.

Figure 5:
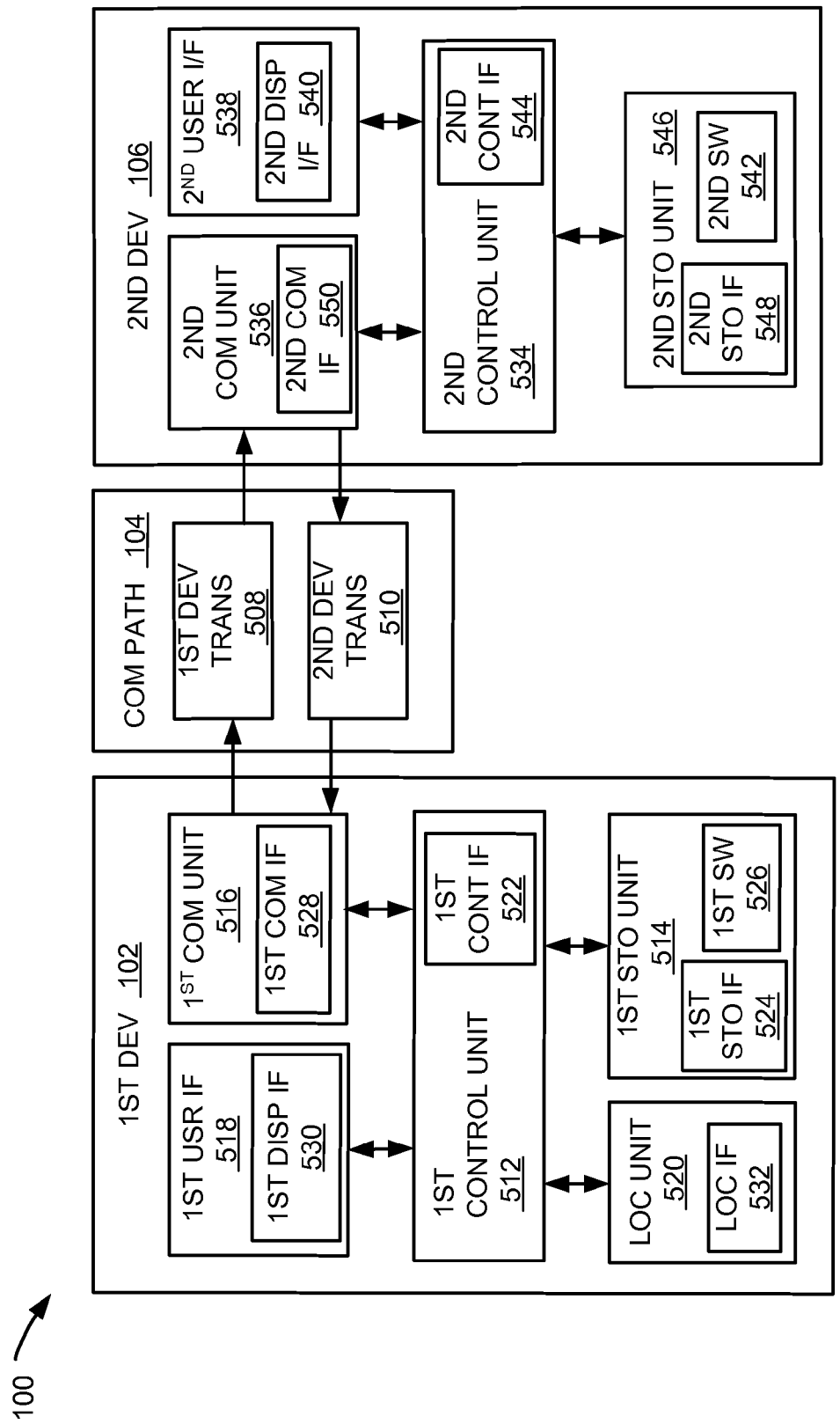
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 100.

The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first device 102 can be similarly described by the first device 102. The first control unit 512 can include a first control interface 522. The first storage unit 514 can include a first storage interface 524.

The first control unit 512 can execute a first software 526 to provide the intelligence of the navigation system 100. The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 of FIG. 1 via the first communication unit 516.

The first control unit 512 can be implemented in a number of different manners. For example, the first control unit 512 can be a processor, an embedded processor, a microprocessor, a hardware control logic, a hardware finite state machine, a digital signal processor, or a combination thereof.

The first control unit 512 can include the first control interface 522. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system, optical circuitry, waveguides, wireless circuitry, wireline circuitry, or a combination thereof.

The first storage unit 514 can store the first software 526. The first storage unit 514 can also store the relevant information, such as advertisements, points of interest, navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory, Flash memory, disk storage, or a volatile storage such as static random access memory.

The first storage unit 514 can include the first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the output device of the first user interface 518 can include the first display interface 530. The first display interface 530 can include a display, a projector, a video screen, a speaker, or any combination thereof.

The location unit 520 can generate location information, current heading, current acceleration, and current speed of the first device 102, as examples. The location unit 520 can be implemented in many ways. For example, the location unit 520 can function as at least a part of GPS, an inertial navigation system, a cellular-tower location system, a pressure location system, or any combination thereof. Also, for example, the location unit 520 can utilize components such as an accelerometer or GPS receiver.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control unit 512.

For illustrative purposes, the first device 102 is shown with the partition having the first control unit 512, the first storage unit 514, the first user interface 518, the first communication unit 516, and the location unit 520 although it is understood that the navigation system 100 can have a different partition. For example, the first software 526 can be partitioned differently such that some or all of its function can be in the first control unit 512, the location unit 520, and the first communication unit 516. Also, the first device 102 can include other functional units not shown in FIG. 5 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine, a digital signal processor, or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a micro electromechanical system, optical circuitry, waveguides, wireless circuitry, wireline circuitry, or a combination thereof.

A second storage unit 546 can store the second software 542. The second storage unit 546 can also store the relevant information, such as advertisements, points of interest, navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory, Flash memory, disk storage, or a volatile storage such as static random access memory.

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
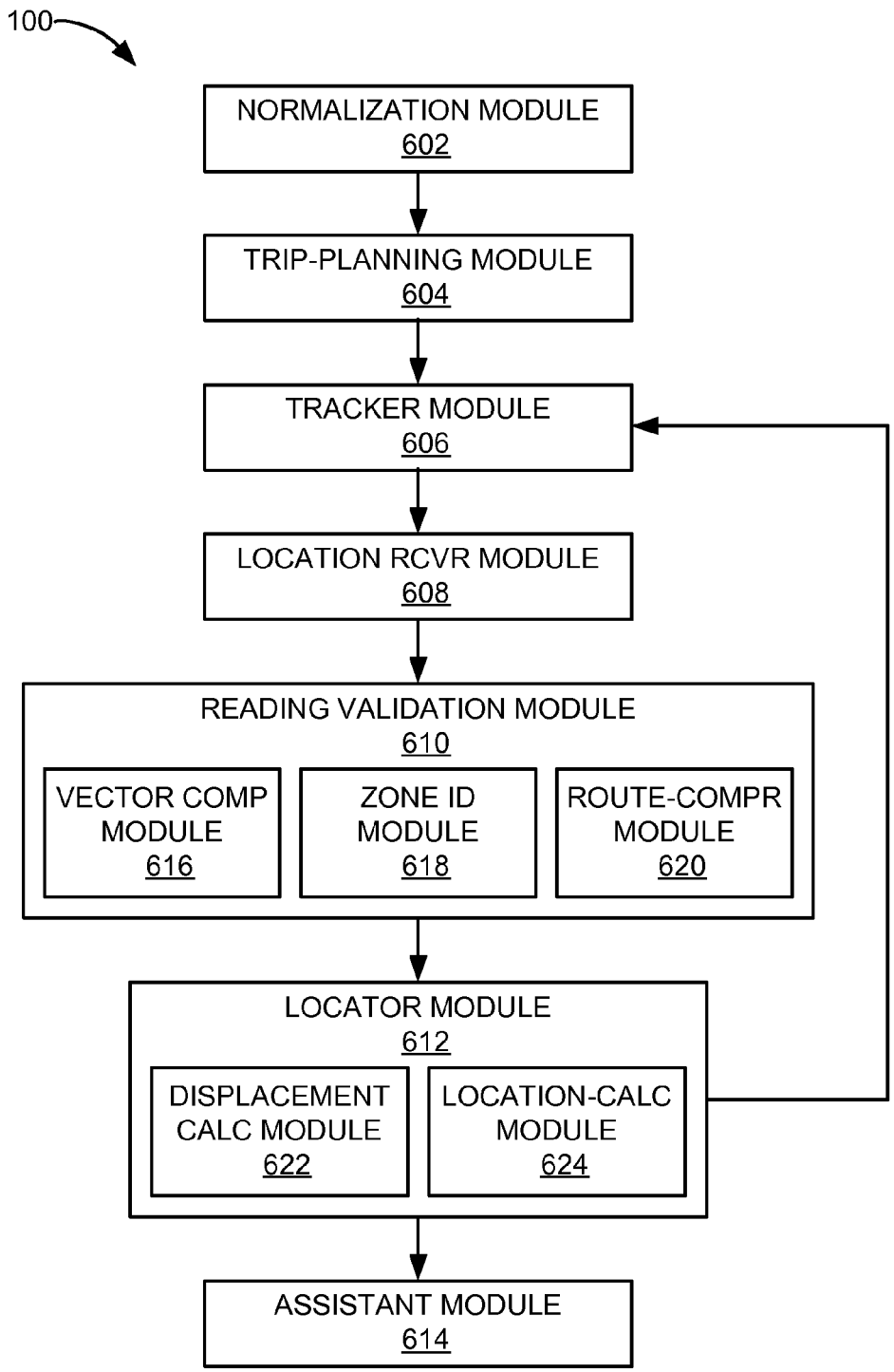
FIG. 6 is a control flow of the navigation system.

Referring now to FIG. 6, therein is shown a control flow of the navigation system 100. The navigation system 100 can include a normalization module 602, a trip-planning module 604, a tracker module 606, a location receiver module 608, a reading validation module 610, a locator module 612, and an assistant module 614.

The normalization module 602 can be coupled to the trip-planning module 604, which can be coupled to the tracker module 606. The tracker module 606 can be coupled to the location receiver module 608, which can be coupled to the reading validation module 610. The reading validation module 610 can be coupled to the locator module 612, which can be coupled to the assistant module 614 and the tracker module 606.

The purpose of the normalization module 602 is to condition the information from the location unit 520 of FIG. 5 for other modules to process and translate the orientation of the first device 102 of FIG. 5 to match the axes of travel. The normalization module 602 can filter out the glitches in the accelerometer acceleration 208 of FIG. 2. For example, the normalization module 602 can mask the accelerometer acceleration 208 that is close to white noise, a random fluctuation in the signal characterizing the information, or that is less than 0.001 g for less than 0.01 seconds. The normalization module 602 can filter out the small movements associated with the mode of travel, such as road vibration or the vertical undulation that occurs during walking.

The normalization module 602 can determine the forward direction 232 of FIG. 2 for monitoring the first device 102. The first device 102 can be oriented in different ways during travel. For example, while an in-dash navigation unit would have fixed axes of travel relative to its orientation, a hand-held unit or a smart phone can be oriented differently relative to the direction of travel. The normalization module 602 can determine the forward direction 232 in many ways.

For example, the normalization module 602 can determine the forward direction 232 by using the direction most often travelled and the gravitational pull of the earth. The normalization module 602 can set the direction most often travelled as the forward direction 232. The normalization module 602 can set the direction of the gravitational pull as down or other equivalent axis and polarity.

Also, for example, the normalization module 602 can determine the forward direction 232 by using visual cues. The normalization module 602 can view the surroundings of the first device 102 for visual cues, such as the human body or the shape of various vehicles. The normalization module 602 can derive from the visual cues the forward direction 232.

The normalization module 602 can also normalize the axes of the accelerometer acceleration 208. The normalization module 602 can translate the orientation of the first device 102 to match the forward direction 232.

For illustrative purposes, the normalization module 602 will be described as translating the orientation of the first device 102 so that the positive direction of the z-axis on the first device 102 to point toward the forward direction 232. However, it is understood that the normalization module 602 can operate differently.

For example, the normalization module 602 can calculate the offset between the forward direction 232 and the orientation of the first device 102, such as 92 degrees from the positive z-axis to the forward direction 232. Also, for example, the normalization module 602 can translate any other axis to match the forward direction 232.

The normalization module 602 can use the first control unit 512 of FIG. 5, the second control unit 534 of FIG. 5, the location unit 520, or a combination thereof to determine the forward direction 232 and translate the orientation of the first device 102 to the forward direction 232. The normalization module 602 can use the first storage unit 514 of FIG. 5, the second storage unit 546 of FIG. 5, or a combination thereof to store the re-oriented axes of the first device 102.

The purpose of the trip-planning module 604 is to calculate the route 216 of FIG. 2 for guiding the user from the starting point 218 of FIG. 2 to the destination 220 of FIG. 2. The trip-planning module 604 can identify the detailed-guidance portion 222 of FIG. 2 on the route 216. The trip-planning module can also generate the detailed instruction 224 of FIG. 2 and identify the safety condition 226 of FIG. 2 associated with the detailed-guidance portion 222 on the route 216. The details of the trip-planning module 604 will be discussed below.

The purpose of the tracker module 606 is to identify where the first device 102 has been before the current time. The tracker module 606 can identify the last-known location 206 for monitoring the first device 102. The tracker module 606 can identify the last-known location 206 of FIG. 2 by setting the values of the last-known location 206 identical to the values of the device-location 204 of FIG. 2 immediately before updating the device-location 204.

For example, the tracker module 606 can assign the coordinates of the device-location 204 to the last-known location 206 at the end of the location-fixing interval 308 of FIG. 3. Also, for example, the last-known location 206 can be assigned the value of the device-location 204 when the navigation system 100 calculates the accelerometer location reading 304 of FIG. 3 and before the device-location 204 is updated with the accelerometer location reading 304.

The tracker module 606 can use the first control unit 512, the second control unit 534, the location unit 520, or a combination thereof to identify the last-known location 206. The tracker module 606 can use the first storage unit 514, the second storage unit 546, or a combination thereof to store the last-known location 206.

The purpose of the location receiver module 608 is to receive the location information from the remote location system 108 of FIG. 1. The location receiver module 608 can receive the first location reading 302 of FIG. 3 for locating the first device 102 with the remote location system 108. For example, the location receiver module 608 can receive GPS location information from GPS satellites. Also, for example, the location receiver module 608 can send and receive location information from cellular towers.

The location receiver module 608 can also set the location-fixing interval 308 for receiving the first location reading 302 from the remote location system 108. The location receiver module 608 can set the location-fixing interval 308 by multiplying the minimum sampling duration of the location unit 520.

For example, if the fastest sampling rate of the location unit 520 is every 2 seconds, the location receiver module 608 can set the location-fixing interval 308 by multiplying 2 seconds by a factor, such as 1 or 124. The multiplication factor can be predetermined by the user, the navigation system 100, the software manufacturer, or a combination thereof.

The location receiver module 608 can use the location unit 520 to receive the first location reading 302. The location receiver module 608 can use the first storage unit 514, the second storage unit 546, or a combination thereof to store the first location reading 302. The location receiver module 608 can use the first control unit 512, the second control unit 534, or a combination thereof to set the location-fixing interval 308. The location receiver module 608 can use the first storage unit 514, the second storage unit 546, or a combination thereof to store the location-fixing interval 308.

The purpose of the reading validation module 610 is to determine the validity of the first location reading 302. The reading validation module 610 can have a vector comparison module 616, a zone identification module 618, and a route-comparison module 620.

The purpose of the vector comparison module 616 is to compare the first location reading 302 to the accelerometer acceleration 208 to validate the first location reading 302. The vector comparison module 616 can compare the direction 212 of the accelerometer acceleration 208 to the direction from the last-known location 206 to the first location reading 302.

The vector comparison module 616 can calculate the direction from the last-known location 206 to the first location reading 302. The vector comparison module 616 can calculate the direction by subtracting the coordinates of the last-known location 206 from the first location reading 302. The vector comparison module 616 can compare the difference in the coordinates to determine the relative direction from the last-known location 206 to the first location reading 302.

For example, if the user is heading north, the forward direction 232 and the +z direction of the user would point north and −x direction would point east. When the longitude of the first location reading 302 increases to the west or decreases to the east from the last-known location 206, the vector comparison module 616 can determine that the first location reading 302 is left of or toward the +x direction of the last-known location 206. When the latitude increases to the north or decreases to the south, the vector comparison module 616 can determine that the first location reading 302 is in front or toward the +z direction of the last-known location 206.

The vector comparison module 616 can compare the calculated direction from the last-known location 206 to the first location reading 302 to the direction 212 of the accelerometer acceleration 208. If the calculated direction and the direction 212 of the accelerometer acceleration 208 do not match, the vector comparison module 616 can determine the first location reading 302 to be invalid.

For example, if the first location reading 302 is directly in front of the last-known location 206 but the accelerometer acceleration 208 is along the +x direction, the vector comparison module 616 can determine the first location reading 302 to be invalid. The vector comparison module 616 can set a bit, a flag, or return a predetermine value, or a combination thereof to invalidate the first location reading 302. The invalid determination of the first location reading 302 can cause the locator module 612 to calculate the accelerometer location reading 304.

For illustrative purposes, the vector comparison module 616 is described as comparing the calculated direction from the last-known location 206 to the direction 212 of the accelerometer acceleration 208. However, it is understood that the vector comparison module 616 can operate differently.

For example, in embodiments where the accelerometer location reading 304 is regularly updated, more often than the location-fixing interval 308 of FIG. 3, the vector comparison module 616 can compare the accelerometer location reading 304 to the first location reading 302. The first location reading 302 can be determined valid if the first location reading 302 is within a predetermined distance from the accelerometer location reading 304.

The vector comparison module 616 can also compare the direction 212 of the accelerometer acceleration 208 to the forward direction 232. The vector comparison module 616 can determine the first location reading 302 as invalid when the user slows down to a stop.

For example, when the accelerometer acceleration 208 is in the −z direction and the resulting speed of the user is within a predetermined amount of zero, the vector comparison module 616 can determine the first location reading 302 as being invalid. The condition for determining the stop state using the accelerometer acceleration 208 can be predetermined by the user, the navigation system 100, the software manufacturer, or a combination thereof.

The vector comparison module 616 can retain the values of the travel state 402 of FIG. 4. For example, the vector comparison module 616 can keep the values of the travel state 402, such as the constant velocity state 414 of FIG. 4 or the right turn state 416 of FIG. 4, up to a predetermined number or time. The vector comparison module 616 may be predetermined to retain the travel state 402 by the user, the navigation system 100, the software manufacturer, hardware manufacturer, or a combination thereof.

For a specific example, the navigation system 100 may set the number of database entries or data variables to 15 to retain the last 15 values of the travel state 402 in sequence. Also, for example, the user may set the time as 1 hour to retain all of the values of the travel state 402 in sequence over the last 1 hour.

The vector comparison module 616 can compare the sequential values of the travel state 402, starting from the last-known location 206 to the current value, to the first location reading 302 to validate the first location reading 302. The vector comparison module 616 can use predetermined tables or formulas and the sequence of values for the travel state 402 to determine the estimated location or direction for the user's current location.

The vector comparison module 616 can compare the estimated location or direction to the first location reading 302. The vector comparison module 616 can determine the first location reading 302 to be valid if the first location reading 302 is within a predetermined range from the estimated location or direction of the user's current location. The vector comparison module 616 can also pass the values of the travel state 402 to the locator module 612.

It has been discovered that the present invention provided the navigation system 100 that provide easier usability for the user and improve the safety of the user. The accelerometer acceleration 208 and the process of invalidating the first location reading 302 and using the accelerometer location reading 304 gives rise to the benefit by providing faster and more accurate location of the user along the route 216.

For example, ignoring the first location reading 302 that is faulty or overshoots the user's stopped location can enable the navigation system 100 to provide accurate and precise guidance to the user. The accurate and precise guidance can keep the user from going to dangerous situation or locations. The accurate and precise guidance can also allow the user to focus on maneuvering the vehicle and not on deciphering the validity of the first location reading 302.

It has also been discovered that the present invention provided the navigation system 100 that provide improved tracking of the user's movements. The accelerometer acceleration 208, the process of invalidating the first location reading 302, and the accelerometer location reading 304 gives rise to the benefit by recognizing and replacing the faulty location information.

It has further been discovered that the present invention provided the navigation system 100 that provide less power consumption of the first device 102. The accelerometer acceleration 208, the process of invalidating the first location reading 302, and the accelerometer location reading 304 gives rise to the benefit by providing faster and more accurate location of the user along the route 216. Since accuracy and reliability can be maintained without constantly communicating with the remote location system 108, the location-fixing interval 308 can be increased and lessen the power consumption of the first device 102.

The vector comparison module 616 can use the first control unit 512, the second control unit 534, or a combination thereof to access the accelerometer acceleration 208 and the first location reading 302 from the location unit 520. The vector comparison module 616 can use the first control unit 512, the second control unit 534, or a combination thereof to calculate the direction between the first location reading 302 and the last-known location 206. The vector comparison module 616 can use the first control unit 512, the second control unit 534, or a combination thereof to compare the accelerometer acceleration 208 to the calculated direction.

The vector comparison module 616 can also use the first control unit 512, the second control unit 534, or a combination thereof to access the accelerometer location reading 304 stored on the first storage unit 514, the second storage unit 546, or a combination thereof. The vector comparison module 616 can use the first control unit 512, the second control unit 534, or a combination thereof to compare the first location reading 302 to the accelerometer location reading 304. The vector comparison module 616 can use the first control unit 512, the second control unit 534, or a combination thereof to determine the first location reading 302 as being invalid.

The purpose of the zone identification module 618 is to identify the inoperable zone 306 of FIG. 3 for receiving the first location reading 302. The zone identification module 618 can determine the first location reading 302 to be invalid when the first location reading 302 is within the inoperable zone 306.

The zone identification module 618 can identify the inoperable zone 306 by recording the accelerometer location reading 304 when the first location reading 302 is determined to be invalid. The zone identification module 618 can add a predetermined radius to the accelerometer location reading 304 to identify the inoperable zone 306.

The zone identification module 618 can also identify the inoperable zone 306 when the first location reading 302 is determined to be invalid frequently within a given area. The zone identification module 618 can identify the inoperable zone 306 when a predetermined number of the first location readings are determined to be invalid and the accelerometer location readings are within a preset distance from each other.

For example, the zone identification module 618 can identify the inoperable zone 306 when the first location reading 302 is determined to be invalid on five or more occasions, within a mile radius from the first invalid reading, within 30 days. The zone identification module 618 can identify the area within one-mile radius of the first invalid reading as the inoperable zone 306. The condition for identifying the inoperable zone 306 can be predetermined by the user, the navigation system 100, the software manufacturer, or a combination thereof.

It has been discovered that the present invention provided the navigation system 100 that provide accurate and user specific guidance. The inoperable zone 306 gives rise to the benefit by identifying the areas where the user's device frequently has trouble accessing the remote location system 108. The navigation system 100 can identify the inoperable zone 306 specific to the user's frequent areas and the capability of the first device 102, which can allow the navigation system 100 to accurately guide the user.

The zone identification module 618 can further identify the inoperable zone 306 based on landscape and infrastructure. For example, the zone identification module 618 can identify areas that do not have a cellular tower within a predetermined distance as an inoperable zone. The zone identification module 618 can use the predetermined conditions to find areas where the signals from the remote location system 108 are not reliably accessible.

Also, for example, the zone identification module 618 can identify areas that have more than a predetermined number of qualifying structures, such as a building over 60 feet tall or a hill over 100 feet tall and over 20 square miles, within a preset area. The zone identification module 618 can use the predefined conditions to identify dense metropolitan areas or mountainous regions that have structures interfering with the signals from the remote location system 108. The conditions for identifying the inoperable zone 306 can be predetermined by the user, the navigation system 100, the software manufacturer, or a combination thereof.

The zone identification module 618 can use the first storage unit 514, the second storage unit 546, or a combination thereof to store the instances of the accelerometer location reading 304 when the first location reading 302 is determined to be invalid. The zone identification module 618 can use the first control unit 512, the second control unit 534, or a combination thereof to identify the inoperable zone 306 using the accelerometer location reading 304 of the invalid instances.

The zone identification module 618 can also use the first control unit 512, the second control unit 534, or a combination thereof to identify the inoperable zone 306 as a geographical region meeting the conditions stored in the first storage unit 514, the second storage unit 546, or a combination thereof. The zone identification module 618 can store the inoperable zone 306 in the first storage unit 514, the second storage unit 546, or a combination thereof. The zone identification module 618 can use the first control unit 512, the second control unit 534, or a combination thereof to determine the first location reading 302 as being invalid.

The purpose of the route-comparison module 620 is to compare the first location reading 302 to the detailed-guidance portion 222 on the route 216. The route-comparison module 620 can determine the first location reading 302 as being invalid when the first location reading 302 is on the detailed-guidance portion 222 on the route 216.

The route-comparison module 620 can compare the coordinates of the first location reading 302 to the coordinates making up the detailed-guidance portion 222. The route-comparison module 620 can determine the first location reading 302 as being invalid when the first location reading 302 is equal to one of the coordinates making up the detailed-guidance portion 222. The route-comparison module 620 can invalidate the first location reading 302 when the user enters the detailed-guidance portion 222. The invalid determination can cause the navigation system 100 to calculate and use the accelerometer location reading 304 in the detailed-guidance portion 222 to guide the user.

It has been discovered that the present invention provided the navigation system 100 that provide accurate and detailed guidance. The detailed-guidance portion 222, invalidating the first location reading 302 and switching to the accelerometer location reading 304 in the detailed-guidance portion 222 gives rise to the benefit by updating the user's location faster and more accurately than when relying on the remote location system 108.

For example, the navigation system 100 can rely on current GPS to provide 3 feet to 30 feet accuracy in ideal situations. The navigation system 100 can switch to the accelerometer location reading 304, which can be more consistently accurate to less than 10 feet when the user is in the detailed-guidance portion 222.

The route-comparison module 620 can use the first control unit 512, the second control unit 534, or a combination thereof to access the coordinates of the detailed-guidance portion 222 stored on the first storage unit 514, the second storage unit 546, or a combination thereof. The route-comparison module 620 can use the first control unit 512, the second control unit 534, or a combination thereof to compare the coordinates. The route-comparison module 620 can use the first control unit 512, the second control unit 534, or a combination thereof to determine the first location reading 302 as being invalid.

The physical transformation of the first location reading 302, such as signal degradation or aliasing, results in movement in the physical world, such as the invalidation of the first location reading 302 to determine the actual location of the user, based on the operation of the navigation system 100. The movement of people and entities in the real world can be fed back to the navigation system 100 to further operate the navigation system 100 to guide the user.

The purpose of the locator module 612 is to determine the physical location of the first device 102. The locator module 612 can have a displacement calculation module 622 and a location-calculation module 624.

When the reading validation module 610 determines the first location reading 302 to be valid, the locator module 612 can update the device-location 204 with the first location reading 302. The locator module 612 can update the device-location 204 by passing the value of the device-location 204 to the tracker module 606 for identifying the last-known location 206. The locator module 612 can then assign the value of the first location reading 302 to the device-location 204.

The locator module 612 can also calibrate itself when the reading validation module 610 determines the first location reading 302 to be valid. The locator module 612 can calibrate itself by adjusting the distance and/or the time and speed-readings by a factor or an offset to match the accelerometer location reading 304 of FIG. 3 to the first location reading 302.

The locator module 612 can also calibrate itself by adjusting the axis of orientation for the first device 102 to match the accelerometer location reading 304 of FIG. 3 to the first location reading 302. The locator module 612 can apply the factors, offset, the angular offset for the axes, or a combination thereof to further calculate the accelerometer location reading 304.

When the reading validation module 610 determines the first location reading 302 to be invalid, the locator module 612 can use the displacement calculation module 622 and the location-calculation module 624 to calculate the accelerometer location reading 304 from the movement displacement 214 of FIG. 3 and the last-known location 206.

For example, the locator module 612 can use the displacement calculation module 622 and the location-calculation module 624 when the user is in the inoperable zone 306. Also, for example, the locator module 612 can calculate the accelerometer location reading 304 when the direction 212 of the accelerometer acceleration 208 and the direction from the last-known location 206 to the first location reading 302 do not match, as in false GPS readings.

The locator module 612 can update the device-location 204 by passing the value of the device-location 204 to the tracker module 606 for identifying the last-known location 206. The locator module 612 can then assign the value of the accelerometer location reading 304 to the device-location 204.

The locator module 612 can use the first control unit 512, the second control unit 534, or a combination thereof to update the device-location 204. The locator module 612 can use the first storage unit 514, the second storage unit 546, or a combination thereof to store the device-location 204.

The purpose of the displacement calculation module 622 is to calculate the distance and direction travelled during a period. The displacement calculation module 622 can calculate the distance and direction travelled from the accelerometer acceleration 208. The displacement calculation module 622 can calculate the movement displacement 214 from the time when the last-known location 206 is identified.

The displacement calculation module 622 can calculate the lateral and forward-backward displacements making up the movement displacement 214 using methods such as extrapolating the movement displacement 214 by integrating the accelerometer acceleration 208, trigonometry, or a combination thereof.

The displacement calculation module 622 can calculate the components making up the movement displacement 214 by integrating the accelerometer acceleration 208 along the axes of movement. For example, if the accelerometer acceleration 208 was both 3 feet/minute/minute to the left and 5 feet per/minute/minute for 3 minutes forward, the movement displacement 214 would be a combination of 13.5 feet displacement to the left and 18 feet displacement forward.

The displacement calculation module 622 can also calculate the components making up the movement displacement 214 using trigonometry. For example, if the user travels 6 feet in the direction 36.9 degrees to the left from the direction of the road, the movement displacement 214 would be 6 feet. The displacement calculation module 622 can calculate the x-axis component of the movement displacement 214 by multiplying the magnitude of the movement displacement 214 by the sine of 36.86 degrees. The displacement calculation module 622 can calculate the x-axis component of the movement displacement 214 to be 3 feet to the left.

Continuing with the example, the displacement calculation module 622 can calculate the z-axis component of the movement displacement 214 by multiplying the magnitude of the movement displacement 214 by the cosine of 36.86 degrees. The displacement calculation module 622 can calculate the z-axis component of the movement displacement 214 to be 5 feet forward.

The displacement calculation module 622 can also calculate the movement displacement 214 resulting from constant speed. The displacement calculation module 622 can integrate the accelerometer acceleration 208 to calculate the speed. The displacement calculation module 622 can also detect the speed from the speedometer or other indicators on the vehicle. The displacement calculation module 622 can multiply the speed and the duration of the speed to calculate the distance the user has traveled during the duration.

The displacement calculation module 622 can calculate the movement displacement 214 by combining the calculated distances and directions from the time when the last-known location 206 was identified. The displacement calculation module 622 can reset the movement displacement 214 when the last-known location 206 is updated by the tracker module 606. The displacement calculation module 622 can reset the movement displacement 214 by assigning a null set or a zero value.

The displacement calculation module 622 can also use the sequential values of the travel state 402 to calculate the movement displacement 214. The displacement calculation module 622 can start from the last-known location 206 and find the next occurring value of the travel state 402. The displacement calculation module 622 can find the next occurring value by comparing the time markers or the update periods of the last-known location 206 and the travel state 402.

The displacement calculation module 622 can use the time markers between the values of the travel state 402 as vector segments and calculate the distance and direction the first device 102 travelled between the values. For example, the last-known location 206 can be the user's home and the corresponding value of the travel state 402 can be the static state 408 of FIG. 4 with the next occurring values of the acceleration state 410 of FIG. 4, the right turn state 416 of FIG. 4, and the constant velocity state 414 of FIG. 4.

Continuing with the example, the displacement calculation module 622 can use the time markers of each state to determine how long each values of the travel state 402 lasted. The displacement calculation module 622 can use the associated velocities and/or the accelerometer acceleration 208 along with above described methods to determine the distance and direction traveled between the values of the travel state 402. The displacement calculation module 622 can sum the segments to calculate the movement displacement 214.

The displacement calculation module 622 can use the first control unit 512, the second control unit 534, or a combination thereof to calculate the distance traveled by the user. The displacement calculation module 622 can use the first storage unit 514, the second storage unit 546, or a combination thereof to store the movement displacement 214.

The purpose of the location-calculation module 624 is to calculate the accelerometer location reading 304 from the movement displacement 214 and the last-known location 206. The location-calculation module 624 can calculate the accelerometer location reading 304 by combining the movement displacement 214 and the last-known location 206. For example, if the last known location is (A', B') and the user has the movement displacement 214 of 10 feet to the right, the accelerometer location reading 304 can be (A', B"), where B" is the coordinate reading of the location 10 feet to the right of B'.

In an alternative embodiment, the above described calculations for the movement displacement 214 and the accelerometer location reading 304 the can be done by the vector comparison module 616. The vector comparison module 616 can calculate the movement displacement 214 and add the displacement to the last-known location 206 to calculate the accelerometer location reading 304.

In the alternative embodiment, the vector comparison module 616 can compare the accelerometer location reading 304 to the first location reading 302 to determine the validity of the first location reading 302. The vector comparison module 616 can pass the accelerometer location reading 304 to other modules when the first location reading 302 is invalid. The vector comparison module 616 can pass the first location reading 302 when it is valid.

The location-calculation module 624 can use the first control unit 512, the second control unit 534, or a combination thereof to calculate the accelerometer location reading 304. The location-calculation module 624 can use the first storage unit 514, the second storage unit 546, or a combination thereof to store the accelerometer location reading 304.

The physical transformation of the accelerometer location reading 304, such as while driving or walking, results in movement in the physical world, such as the user moving or maneuvering to follow the route 216, based on the operation of the navigation system 100. The movement of people and entities in the real world can be fed back to the navigation system 100 to further operate the navigation system 100 to guide the user.

It has been discovered that the present invention provided the navigation system 100 that provide accurate and detailed guidance. The accelerometer location reading 304 gives rise to the benefit by calculating the user's location when the location information from the remote location system 108 is faulty or not accurate enough for the situation or the location.

The purpose of the assistant module 614 is to assist the user in traversing the route 216. The assistant module 614 can determine the travel deviation 228 of FIG. 2. The assistant module 614 can also warn the user by generating the reduce-speed warning 230 of FIG. 2 when the user is going faster than the speed specified in the safety condition 226. The details of the assistant module 614 will be discussed below.

Referring now to FIG. 7, therein is shown a detailed view of the trip-planning module 604 of FIG. 6. The trip-planning module 604 can include a route-calculation module 702, a detail identification module 704, and an instruction generator module 706.

The trip-planning module 604 can be coupled to the normalization module 602 of FIG. 6. The trip-planning module 604 can also be coupled to the detail identification module 704, which can be coupled to the instruction generator module 706. The instruction generator module 706 can also be coupled to the tracker module 606 of FIG. 6.

The purpose of the route-calculation module 702 is to calculate the route 216 of FIG. 2 having the starting point 218 of FIG. 2 and the destination 220 of FIG. 2. The route-calculation module 702 can identify the starting point 218 and the destination 220.

The route-calculation module 702 can identify the starting point 218 and the destination 220 from the events and appointments on the user's calendar. The route-calculation module 702 can search the user's calendar for the event or the appointment occurring at a specified time. The route-calculation module 702 can set the location of the event or the appointment as the starting point 218. The route-calculation module 702 can set the location of the event or the appointment occurring next on the user's calendar as the destination 220.

The route-calculation module 702 can also identify the starting point 218 and the destination 220 by querying the user and set the user's inputs to be the starting point 218 and the destination 220. The route-calculation module 702 can also set the device-location 204 of FIG. 2 as the starting point 218.

The route-calculation module 702 can calculate the route 216 going from the starting point 218 to the destination 220. The route-calculation module 702 can calculate the route 216 by identifying a series of paths and nodes, such as intersections or highway exits, which is continuous from the starting point 218 to the destination 220.

The route-calculation module 702 can use the first control unit 512 of FIG. 5, the second control unit 534 of FIG. 5, or a combination thereof to identify the starting point 218 and the destination 220 and calculate the route 216. The route-calculation module 702 can use the first storage unit 514 of FIG. 5, the second storage unit 546 of FIG. 5, or a combination thereof to store the route 216 connecting the starting point 218 and the destination 220.

The purpose of the detail identification module 704 is to identify the detailed-guidance portion 222, having the safety condition 226, on the route 216. The detail identification module 704 can identify the detailed-guidance portion 222 by identifying the turn, merge, exit, stop, or a combination there of along the route 216.

The detail identification module 704 can start from the starting point 218 and follow the route 216. The detail identification module 704 can identify the nodes where the route 216 follows a different street or highway after the node. The detail identification module 704 can identify the node on the route 216 and add a predetermined distance before it to identify the detailed-guidance portion 222.

For example, the detail identification module 704 can identify the first occurring left turn on the route 216. The detail identification module 704 can identify the detailed-guidance portion 222 as the intersection for the left turn and the 200 feet of the route 216 leading up to the intersection. The user, the navigation system 100, the software manufacturer, or a combination thereof can predetermine the distance and the actions used to identify the detailed-guidance portion 222.

The detail identification module 704 can connect multiple nodes when they are within a preset distance to identify the detailed-guidance portion 222. For example, the detail identification module 704 can identify the detailed-guidance portion 222 as the portion on the route 216 starting from the right turn coming out of the starting point 218 and the immediate left turn. The user, the navigation system 100, the software manufacturer, or a combination thereof can preset the distance for combining nodes to identify the detailed-guidance portion 222.

The detail identification module 704 can also determine the safety condition 226 at the detailed-guidance portion 222. For example, the detail identification module 704 can determine the maximum speed allowable for executing the left turn at the detailed-guidance portion 222 while maintaining control of the vehicle.

The detail identification module 704 can use a predetermined list or formula to determine the safety condition 226. For example, the angle of the segments surrounding the turn can be a factor in a formula or be associated with a maximum speed. Also, for example, water on the road can decrease the maximum by 10%. The formula and/or the list can be predetermined by the user, the navigation system 100, the software manufacturer, or a combination thereof.

The detail identification module 704 can use the first control unit 512, the second control unit 534, or a combination thereof to identify the detailed-guidance portion 222 on the route 216. The detail identification module 704 can use the first storage unit 514, the second storage unit 546, or a combination thereof to store the detailed-guidance portion 222.

The purpose of the instruction generator module 706 is to generate the detailed instruction 224 with the detailed-guidance portion 222. The instruction generator module 706 can generate the detailed instruction 224 by identifying the action the user must take to follow the route 216.

For example, if the route 216 goes from one street to another adjacent street in the +x direction, the instruction generator module 706 can identify the action as a left turn. Also, for example, the instruction generator module 706 can identify the action as moving into the exit lane when the route 216 no longer continues on the same highway.

The instruction generator module 706 can generate the detailed instruction 224 by displaying a letter, word, symbol, or a combination thereof associated with the identified action to notify the user of the action the user needs to take to follow the route 216. The instruction generator module 706 can also generate audible cues, sounds, phrases, or a combination thereof to notify the user. For example, the instruction generator module 706 can display an arrow pointing to left or play a pre-recorded phrase that states "left turn ahead."

The instruction generator module 706 can use the first control unit 512, the second control unit 534, the first user interface 518 of FIG. 5, the second user interface 538 of FIG. 5 or a combination thereof to generate the detailed instruction 224. The instruction generator module 706 can use the first storage unit 514, the second storage unit 546, or a combination thereof to store the detailed instruction 224.

Referring now to FIG. 8, therein is shown a detailed view of the assistant module 614 of FIG. 6. The assistant module 614 can include a route-deviation module 802, a safe-speed module 804, and a warning module 806.

The route-deviation module 802 can be coupled to the locator module 612 of FIG. 6. The route-deviation module 802 can also be coupled to the safe-speed module 804, which can be coupled to the warning module 806.

The purpose of the route-deviation module 802 is to determine the travel deviation 228 of FIG. 2 when the accelerometer acceleration 208 of FIG. 2 does not match the route 216 of FIG. 2 at the device-location 204 of FIG. 2. The route-deviation module 802 can determine the travel deviation 228 by comparing the direction 212 of FIG. 2 of the accelerometer acceleration 208 to the direction of the route 216 at the device-location 204.

For example, if the route 216 bends to the left a fork, but the direction 212 of the accelerometer acceleration 208 is along the z-axis, the route-deviation module 802 can determine the occurrence of the travel deviation 228. Also, for example, the route-deviation module 802 can determine the occurrence of the travel deviation 228 when the route 216 is straight but the direction 212 of the accelerometer acceleration 208 is along the x-axis.

The route-deviation module 802 can notify the user of the travel deviation 228. The route-deviation module 802 can use a sound, display, or a combination thereof to notify the user.

The route-deviation module 802 can use the first control unit 512 of FIG. 5, the second control unit 534 of FIG. 5, the first user interface 518 of FIG. 5, the second user interface 538 of FIG. 5 or a combination thereof to determine the travel deviation 228 and notify the user. The route-deviation module 802 can use the first storage unit 514, the second storage unit 546, or a combination thereof to store the travel deviation 228.

The purpose of the safe-speed module 804 is to compare the accelerometer acceleration 208 to the safety condition 226 of FIG. 2 when the device-location 204 is within the detailed-guidance portion 222 of FIG. 2 on the route 216. The warning module 806 can compare the accelerometer acceleration 208 to the safety condition 226 when the first location reading 302 and/or the accelerometer location reading 304 is within the detailed-guidance portion 222.

The safe-speed module 804 can calculate the speed of the user by integrating the accelerometer acceleration 208 like the locator module 612 of FIG. 6. The safe-speed module 804 can compare the resulting speed of the user to the safety condition 226. The safe-speed module 804 can subtract the speed of the user from the speed specified in the safety condition 226. The safe-speed module 804 can activate the warning module 806 when the difference between the two speeds is less than zero.

The safe-speed module 804 can use the first control unit 512, the second control unit 534, or a combination thereof to calculate the speed from the accelerometer acceleration 208. The safe-speed module 804 can use the first control unit 512, the second control unit 534, or a combination thereof to compare the resulting speed of the user to the safety condition 226.

The purpose of the warning module 806 is to generate the reduce-speed warning 230 of FIG. 2 when the accelerometer acceleration 208 does not match the safety condition 226. The warning module 806 can generate the reduce-speed warning 230 by displaying a letter, word, symbol, or a combination thereof to notify the user of the action the user needs to take to follow the route 216. The warning module 806 can also generate audible cues, sounds, phrases, or a combination thereof to notify the user. For example, the warning module 806 can display a yellow sign with "SLOW DOWN" written therein or play a pre-recorded phrase that states, "reduce speed."

The warning module 806 can use the first control unit 512, the second control unit 534, the first user interface 518 of FIG. 5, the second user interface 538 of FIG. 5 or a combination thereof to can generate the reduce-speed warning 230. The warning module 806 can use the first storage unit 514, the second storage unit 546, or a combination thereof to store the reduce-speed warning 230.

The navigation system 100 can be partitioned between the first device 102 of FIG. 5 and the second device 106 of FIG. 5. For example, the navigation system 100 can be partition into the functional units of the first device 102, the second device 106, or a combination thereof. The vector comparison module 616 of FIG. 6 and the location-calculation module 624 of FIG. 6 can be on the first device 102 and the zone identification module 618 of FIG. 6 and the displacement calculation module 622 of FIG. 6 can be on the second device 106.

The navigation system 100 can also be implemented as additional functional units in the first device 102, the second device 106, or a combination thereof. For example, the reading validation module 610 of FIG. 6 can be an additional functional unit in the first device 102 and the locator module 612 of FIG. 6 can be additional functional unit in the second device 106.

Thus, it has been discovered that the navigation system with interactive accelerometer mechanism of the present invention furnishes important and heretofore unknown and unavailable solutions, capabilities, and functional aspects for locating relevant contacts.

Figure 9:
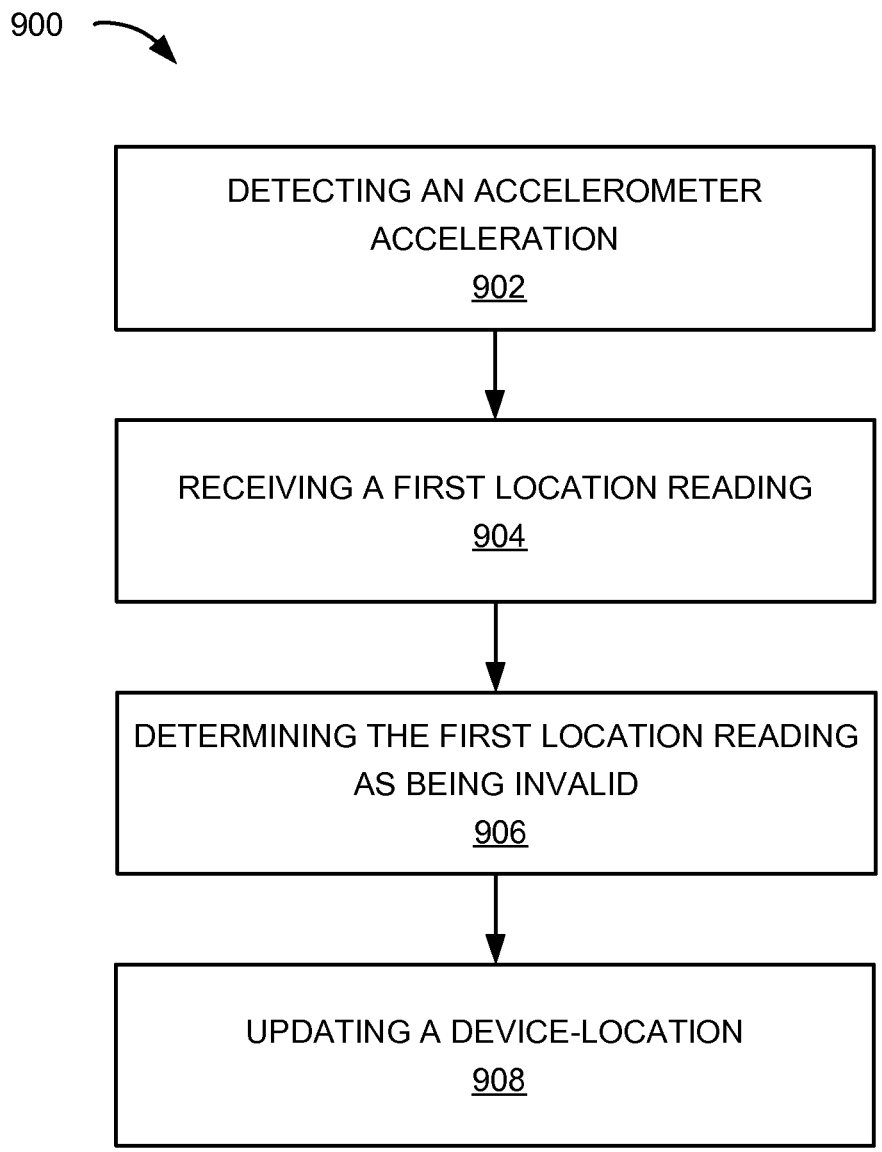
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: detecting an accelerometer acceleration, having a magnitude and a direction, for monitoring a device in a block 902; receiving a first location reading for locating the device with a remote location system in a block 904; determining the first location reading as being invalid 906; and updating a device-location from the first location reading with the accelerometer acceleration for displaying on the device in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description.

Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   detecting an accelerometer acceleration, having a magnitude and a direction, for monitoring a device;
   identifying a last-known location for monitoring a device;
   receiving a first location reading for locating the device with a remote location system;
   determining the first location reading as being invalid based on a comparison to the accelerometer acceleration; and
   updating a device-location from the last-known location with the accelerometer acceleration when the first location reading is invalid for displaying on the device.

2. The method as claimed in claim 1 further comprising:
   calculating a movement displacement from the last-known location with the accelerometer acceleration; and
   wherein:
   updating the device-location includes calculating the device-location from the movement displacement and the last-known location.

3. The method as claimed in claim 1 wherein determining the first location reading as being invalid includes comparing the direction of the accelerometer acceleration to the direction from the last-known location to the first location reading.

4. The method as claimed in claim 1 further comprising:
   calculating a route having a starting point and a destination;
   identifying a detailed-guidance portion on the route;
   generating a detailed instruction with the detailed-guidance portion; and
   wherein:
   determining the first location reading as being invalid includes comparing the first location reading to the detailed-guidance portion on the route.

5. The method as claimed in claim 1 further comprising:
   identifying an inoperable zone for receiving the first location reading;
   calculating an accelerometer location reading; and
   wherein:
   updating the device-location includes updating the device-location with the accelerometer location reading in the inoperable zone.

6. A method of operation of a navigation system comprising:
   identifying a last-known location for monitoring a device;
   detecting an accelerometer acceleration, having a magnitude and a direction, for monitoring the device;
   receiving a first location reading for locating the device with a remote location system;
   determining the first location reading as being invalid based on comparing the direction of the accelerometer acceleration to the direction from the last-known location to the first location reading;
   calculating a movement displacement from the accelerometer acceleration when the first location reading is determined to be invalid;
   calculating an accelerometer location reading with the movement displacement and the last-known location; and
   updating a device-location with the accelerometer location reading for displaying on the device.

7. The method as claimed in claim 6 further comprising:
   calculating a route having a starting point and a destination; and
   determining a travel deviation when the accelerometer acceleration does not match the route at the device-location.

8. The method as claimed in claim 6 further comprising:
   calculating a route having a starting point and a destination;
   identifying a detailed-guidance portion, having a safety condition, on the route;
   generating a detailed instruction with the detailed-guidance portion;
   comparing the accelerometer acceleration to the safety condition when the device-location is within the detailed-guidance portion on the route; and
   generating a reduce-speed warning when the accelerometer acceleration does not match the safety condition.

9. The method as claimed in claim 6 further comprising:
   determining a forward direction for monitoring the device; and
   wherein:
   determining the first location reading as being invalid includes comparing the direction of the accelerometer acceleration to the forward direction.

10. The method as claimed in claim 6 further comprising:
    setting a location-fixing interval for receiving the first location reading from a remote location system; and
    wherein:
    updating the device-location includes updating the device-location between the location-fixing interval.

11. A navigation system comprising:
    a location unit for detecting an accelerometer acceleration, having a magnitude and a direction, for monitoring a device;
    a tracker module, coupled to the location unit, for identifying a last-known location for monitoring the device;
    a location receiver module, coupled to the location unit, for receiving a first location reading for locating the device with a remote location system;
    a reading validation module, coupled to the location receiver module, for determining the first location reading as being invalid based on a comparison to the accelerometer acceleration; and
    a locator module, coupled to the reading validation module, for updating a device-location from the last known location with the accelerometer acceleration when the first location reading is invalid for displaying on the device.

12. The system as claimed in claim 11 further comprising:
    a displacement calculation module, coupled to the tracker module, for calculating a movement displacement from the last-known location with the accelerometer acceleration; and
    a location-calculation module, coupled to the locator module, for calculating the device-location from the movement displacement and the last-known location.

13. The system as claimed in claim 11 further comprising a vector comparison module, coupled to the reading validation module, for comparing the direction of the accelerometer acceleration to the direction from the last-known location to the first location reading.

14. The system as claimed in claim 11 further comprising:
    a route-calculation module, coupled to the locator module, for calculating a route having a starting point and a destination;
    a detail identification module, coupled to the route-calculation module, for identifying a detailed-guidance portion on the route;

an instruction generator module, coupled to the detail identification module, for generating a detailed instruction with the detailed-guidance portion; and a route-comparison module, coupled to the detail identification module, for comparing the first location reading to the detailed-guidance portion on the route.

15. The system as claimed in claim 11 further comprising:

a zone identification module, coupled to the locator module, for identifying an inoperable zone for receiving the first location reading;

a location-calculation module, coupled to the locator module, for calculating an accelerometer location reading; and wherein:

the locator module is for updating the device-location with the accelerometer location reading in the inoperable zone.

16. The system as claimed in claim 11 further comprising:

a vector comparison module, coupled to the reading validation module, for comparing the direction of the accelerometer acceleration to the direction from the last-known location to the first location reading;

a displacement calculation module, coupled to the tracker module, for calculating a movement displacement from the accelerometer acceleration when the first location reading is determined to be invalid;

a location-calculation module, coupled to the locator module, for calculating an accelerometer location reading with the movement displacement and the last-known location; and wherein:

the locator module is for updating the device-location with the accelerometer location reading for displaying on the device.

17. The system as claimed in claim 16 further comprising:

a route-calculation module, coupled to the locator module, for calculating a route having a starting point and a destination; and wherein:

a route-deviation module, coupled to the route-calculation module, for determining a travel deviation when the accelerometer acceleration does not match the route at the device-location.

18. The system as claimed in claim 16 further comprising:

a route-calculation module, coupled to the locator module, for calculating a route having a starting point and a destination;

a detail identification module, coupled to the route-calculation module, for identifying a detailed-guidance portion, having a safety condition, on the route;

an instruction generator module, coupled to the detail identification module, for generating a detailed instruction with the detailed-guidance portion;

a safe-speed module, coupled to the detail identification module, for comparing the accelerometer acceleration to the safety condition when the device-location is within the detailed-guidance portion on the route; and a warning module, coupled to the safe-speed module, for generating a reduce-speed warning when the accelerometer acceleration does not match the safety condition.

19. The system as claimed in claim 16 further comprising:

a normalization module, coupled to the locator module, for determining a forward direction for monitoring the device; and wherein:

the vector comparison module is for comparing the direction of the accelerometer acceleration to the forward direction.

20. The system as claimed in claim 16 wherein:

the location receiver module is for setting a location-fixing interval for receiving the first location reading from a remote location system; and the locator module is for updating the device-location between the location-fixing interval.

* * * * *